(12) United States Patent
Hahn et al.

(10) Patent No.: US 12,252,864 B2
(45) Date of Patent: Mar. 18, 2025

(54) WORKING MACHINE, A WORK ATTACHMENT AND A COMBINATION THEREOF

(71) Applicant: Volvo Construction Equipment AB, Eskilstuna (SE)

(72) Inventors: Christian Hahn, Schmeiz (DE); Björn Dusemund, Trier Rheinland Pfalz (DE)

(73) Assignee: Volvo Construction Equipment AB, Eskilstuna (SE)

( * ) Notice: Subject to any disclaimer, the term of this patent is extended or adjusted under 35 U.S.C. 154(b) by 156 days.

(21) Appl. No.: 17/043,409

(22) PCT Filed: Apr. 6, 2018

(86) PCT No.: PCT/EP2018/025095
§ 371 (c)(1),
(2) Date: Sep. 29, 2020

(87) PCT Pub. No.: WO2019/192669
PCT Pub. Date: Oct. 10, 2019

(65) Prior Publication Data
US 2021/0108392 A1    Apr. 15, 2021

(51) Int. Cl.
*B60L 1/00*    (2006.01)
*B60L 50/60*   (2019.01)
(Continued)

(52) U.S. Cl.
CPC ............ *E02F 3/3654* (2013.01); *B60L 1/003* (2013.01); *B60L 50/60* (2019.02); *E02F 3/96* (2013.01);
(Continued)

(58) Field of Classification Search
CPC ........ E02F 3/3654; B60L 50/60; B60L 1/003; B60L 53/16; B60L 2210/10
(Continued)

(56) References Cited

U.S. PATENT DOCUMENTS

| 8,004,242 B1 * | 8/2011 | Purkey | B60R 16/033 |
| | | | 320/132 |
| 2002/0189435 A1 * | 12/2002 | Domann | E02F 9/2275 |
| | | | 91/459 |

(Continued)

FOREIGN PATENT DOCUMENTS

| CN | 102251545 A | 11/2011 |
| DE | 20012390 U1 | 10/2000 |

(Continued)

OTHER PUBLICATIONS

International Search Report and Written Opinion of the International Searching Authority, PCT/EP2018/025095, mailed Dec. 10, 2018, 11 pages.
Chinese First Office Action dated Jan. 28, 2022 for Chinese Patent Application No. 201880088883.2, 28 pages (including English translation).

*Primary Examiner* — Rexford N Barnie
*Assistant Examiner* — Swarna N Chowdhuri
(74) *Attorney, Agent, or Firm* — Sage Patent Group

(57) ABSTRACT

A working machine includes a work attachment connection arrangement configured to operationally connect to the working machine a work attachment provided with a work tool; and a control system configured to control the operation of the working machine and to control the operation of the work attachment. The working machine further includes: at least a first electric motor; a first rechargeable battery; an electric power circuit connecting the first electric motor and the first rechargeable battery, wherein the work attachment connection arrangement includes a first electrical connector, wherein the first electric connector is configured to be connected to a corresponding electrical connector connected to an auxiliary rechargeable battery.

12 Claims, 2 Drawing Sheets

(51) Int. Cl.
*B60L 53/16* (2019.01)
*E02F 3/36* (2006.01)
*E02F 3/96* (2006.01)
*E02F 9/20* (2006.01)
*E02F 9/22* (2006.01)
*E01H 1/05* (2006.01)
*E01H 5/08* (2006.01)
*E02F 3/28* (2006.01)
*E02F 3/43* (2006.01)
*H02J 7/00* (2006.01)
*H02K 11/00* (2016.01)
*H02K 11/33* (2016.01)

(52) U.S. Cl.
CPC .......... *E02F 9/2025* (2013.01); *E02F 9/2278* (2013.01); *B60L 53/16* (2019.02); *B60L 2200/40* (2013.01); *B60L 2210/10* (2013.01); *B60L 2210/40* (2013.01); *E01H 1/056* (2013.01); *E01H 5/08* (2013.01); *E02F 3/283* (2013.01); *E02F 3/431* (2013.01); *H02J 7/0045* (2013.01); *H02K 11/0094* (2013.01); *H02K 11/33* (2016.01)

(58) Field of Classification Search
USPC .......................................................... 37/468
See application file for complete search history.

(56) References Cited

U.S. PATENT DOCUMENTS

| | | | |
|---|---|---|---|
| 2003/0197420 A1 | 10/2003 | Burton | |
| 2010/0096921 A1* | 4/2010 | Ishida | B60L 50/53 307/82 |
| 2011/0114398 A1 | 5/2011 | Bianco | |
| 2013/0006457 A1* | 1/2013 | Anders | B60W 20/10 180/65.265 |
| 2013/0073222 A1* | 3/2013 | Shin | G06F 30/00 702/34 |
| 2015/0367735 A1* | 12/2015 | Baker | H02M 3/1582 307/10.1 |
| 2016/0137076 A1 | 5/2016 | King et al. | |
| 2018/0029572 A1* | 2/2018 | Schick | B60T 15/027 |
| 2019/0219489 A1* | 7/2019 | Ki | G01N 33/24 |
| 2021/0094535 A1* | 4/2021 | Thompson | B60W 40/06 |

FOREIGN PATENT DOCUMENTS

| | | | | |
|---|---|---|---|---|
| DE | 102011080633 | * | 2/2013 | |
| DE | 102011080633 A1 | * | 2/2013 | ............ B60K 6/485 |
| EP | 0810331 A1 | | 12/1997 | |
| JP | 2011036192 A | | 2/2011 | |
| JP | 2018017011 A | * | 2/2018 | |

* cited by examiner

WORKING MACHINE, A WORK ATTACHMENT AND A COMBINATION THEREOF

CROSS REFERENCE TO RELATED APPLICATIONS

This application is a 35 U.S.C. § 371 national stage application of PCT International Application No. PCT/EP2018/025095 filed on Apr. 6, 2018, the disclosure and content of which is incorporated by reference herein in its entirety.

TECHNICAL FIELD

The invention relates to a working machine, such as a loader vehicle, comprising a work attachment connection arrangement configured to operationally connect to the working machine a work attachment provided with a work tool, such as a sweeper/rotary broom, a snow blower or a bucket. The invention also relates to a work attachment of said type and to a combination of a working machine and a work attachment of the above types. The invention relates in particular to electrically propelled and operated working machines.

The invention is applicable to working machines within the fields of industrial construction machines or construction equipment, in particular loader vehicles, wheel loaders etc. Although the invention will be described with respect to an articulated wheel loader, the invention is not restricted to this particular machine, but may also be used for other working machines connectable to work attachments.

BACKGROUND

There is a growing interest of providing vehicles with electric propulsion and powering means. This holds also for construction vehicles, working machines and similar. For a working vehicle this typically means that also the operation of the vehicle is electrically powered, i.e. operation of lift arms, lifting of bucket etc. Electrically powered operation/propulsion of vehicles typically involves one or more electric motors and one or more rechargeable electric energy storage devices (often referred to as battery packs or simply batteries).

A working vehicle has generally a relatively high power demand and a challenge in electrifying such vehicles is to provide a sufficient battery capacity so that the vehicle can operate during a sufficiently long period of time. This is in particular a challenge for a compact loader vehicle (that may not have room for a large battery pack) connected to a work attachment provided with a work tool that requires additional power, such as a sweeper/rotary broom or a snow blower.

US2002/0189435 discloses an example of a compact loader vehicle provided with a work attachment provided with a rotary broom. Both the loader and the broom are operated by hydraulic means.

There is a need for improvements in the field of electrification of loader working vehicles, such as loader vehicles of the type disclosed in US2002/0189435, in particular for working vehicles intended for connection to a work attachment provided with a work tool that requires additional power.

SUMMARY

An object of the invention is to provide an electrically operated working machine/loader vehicle, a work attachment and a combination thereof, which devices enable a longer time of operation/working. According to a first aspect of the invention, the object is achieved by a working machine according to claim 1.

The invention concerns a working machine, such as a loader vehicle, said working machine comprising: a work attachment connection arrangement configured to operationally connect to the working machine a work attachment provided with a work tool, such as a sweeper/rotary broom, a snow blower or a bucket; and a control system configured to control the operation of the working machine and to, when the work attachment is connected to the working machine via the work attachment connection arrangement, control the operation of the work attachment.

The invention is characterized in that the working machine further comprises: at least a first electric motor configured for operation of the working machine; a first rechargeable battery configured to supply the first electric motor with electric power; an electric power circuit connecting the first electric motor and the first rechargeable battery, wherein the work attachment connection arrangement comprises a first electrical connector connected to the electric power circuit of the working machine, wherein the first electric connector is configured to be connected to a corresponding electrical connector arranged on the work attachment, and wherein the corresponding electrical connector is connected to an auxiliary rechargeable battery arranged on the work attachment, so as to allow electric connection of the auxiliary rechargeable battery to the electric power circuit of the working machine when the work attachment is connected to the working machine via the work attachment connection arrangement.

Thus, the electric power circuit of the machine/loader is connectable to an auxiliary or additional battery arranged on the work attachment. This allows the auxiliary battery to power the loader, i.e. the electric energy storage capacity can be increased and the time of operation of the working machine can be extended. This can be used not only for the application where a certain work tool requires a significantly higher batter capacity, such as a sweeper, but also for e.g. an application where a shovel or bucket is provided with the auxiliary battery so as to provide the working machine with an additional source of electric energy. The auxiliary battery can be used for (additional) powering of various electric motors or for powering of a hydraulic pump on the working machine that could be used to drive various hydraulics motor arranged on the attachment or on the working machine.

Such a design also enables the possibility to control the current between the electric power circuit and each of the first and auxiliary batteries when the work attachment is connected to the working machine, i.e. it can be controlled to what extent each battery should deliver electric energy to the power circuit or to what extent each battery should be supplied with energy from the power circuit (from the other battery or from a charging unit connected to the power circuit). As an example, this design enables the possibility to use the auxiliary battery for operation and propulsion of the working machine; it is for instance possible to switch off/disconnect a close to uncharged first battery and use the auxiliary battery for propulsion of a vehicle back "home" to a charging unit. As a further example, it allows charging of both batteries at the same time, where the current fed to the batteries can be adapted to the particular capacity, charging state, etc. of each of the batteries. Separate charging of the two batteries is of course also possible, which is particularly useful when the work attachment is electrically and mechanically disconnected from the working machine; a first work attachment with an uncharged auxiliary battery may be disconnected from the vehicle and set on charging, and a second work attachment with a fully charged auxiliary battery (or another work attachment without battery) may be connected to the vehicle. Bidirectional DC/DC converters may be used to achieve such a control of the current between the electric power circuit and each of the first and auxiliary batteries when the work attachment is connected to the working machine. Converters of this type are known as such.

The first and the auxiliary batteries may be different or of the same type, capacity, voltage etc.; the term "auxiliary" is not used to indicate any particular difference between the batteries but only to give the batteries different names to enhance clarity.

The term "battery" means an electric energy storage device typically comprising a number of electrically connected battery cells. The cells may be arranged in groups forming sub-batteries that in turn may be connected in various ways. Cells and sub-batteries may be arranged in what often is called battery pack, which also is an example of an electric energy storage device covered by the term "battery". The battery (the electric energy storage device) typically comprises electronic equipment for controlling charging, balancing etc. of the cells and the assembly/assemblies of cells, such as a battery management system (BMS). Batteries, battery packs, electric energy storage devices, BMS etc. are well known as such.

According to an embodiment, the work attachment connection arrangement comprises a second electrical connector connected to the electric power circuit of the working machine, wherein the second electrical connector is configured to be connected to a corresponding electrical connector arranged on the work attachment and connected to an electric work tool motor, wherein the electric work tool motor is arranged on the work attachment and configured to directly or indirectly drive the work tool, so as to allow electric connection of the electric work tool motor to the electric power circuit of the working machine when the work attachment is connected to the working machine via the work attachment connection arrangement.

The electric motor on the work attachment, that may be arranged to drive e.g. a rotary broom, can thereby be connected to the electric power circuit of the vehicle and be powered by either or both of the first and auxiliary batteries. This extends the working time considerably for the vehicle compared to the case where a single vehicle battery is used both for powering the vehicle as well as the work tool of the work attachment.

According to a further embodiment, the control system comprises a control unit and a control connection network connecting the control unit with components the control unit is configured to control, wherein the control network comprises a third connector configured to be connected to a corresponding connector arranged on the work attachment and connected to the electric work tool motor so as to allow the control unit to control the electric work tool motor when the work attachment is connected to the working machine via the work attachment connection arrangement.

Thereby the control unit can control the electric motor arranged on the work attachment. The third connector and the corresponding connector arranged on the work attachment may be configured for wireless communication.

According to a further embodiment, the working machine further comprises a first bidirectional DC/DC converter connected to the electric power circuit and to the first rechargeable battery, wherein the first bidirectional DC/DC converter is configured to control a direction and an intensity/magnitude of an electric current that flows between the electric power circuit and the first rechargeable battery.

As mentioned above, this can be used to control whether electric energy (at a certain rate) is to be delivered from the first battery to the power circuit (e.g. during normal operation of the working machine or when a charging unit is connected to the first battery so as to allow charging also of the auxiliary battery via the power circuit), whether electric energy (at a certain rate) is to be supplied from the power circuit to the first battery (e.g. to allow charging of the first battery from a charging unit connected to the power circuit but at another part thereof, e.g. at the auxiliary battery, or to allow charging from an auxiliary battery that is more fully charged than the first battery), or whether the first battery is to be electrically disconnected from the power circuit (e.g. to avoid current leakage when the working machine is not in operation or when it is preferred to use only the auxiliary battery).

A bidirectional DC/DC converter is capable of internally handling voltage differences so as to direct the current in the desired direction irrespective of the voltage (within reasonable limits) of the two input/output systems or components connected to the converter, i.e. the first battery and the power circuit in this case. In a typical case the voltage of both the first battery and the power circuit is around 48 V. The voltage is likely to vary somewhat around 48 V in the two systems/components depending, for instance, on the level of charge of the battery and the current power output in the power circuit. This can be handled by the bidirectional DC/DC converter.

According to a further embodiment, the working machine further comprises a second bidirectional DC/DC converter connected to the electric power circuit and to the first electric connector, wherein the second bidirectional DC/DC converter is configured to control a direction and an intensity/magnitude of an electric current that flows between the electric power circuit and the first electric connector and thereby to control a direction and an intensity/magnitude of an electric current that flows between the electric power circuit and the auxiliary rechargeable battery when the work attachment is connected to the working machine via the work attachment connection arrangement.

This can be used to control whether electric energy (at a certain rate) is to be delivered from/supplied to the auxiliary battery to/from the power circuit in a corresponding way as described above regarding the first battery.

The use of both the first and second bidirectional DC/DC converters is an advantage in that it gives full control of the flow of the electric current to/from both batteries from/to the electric power circuit when the work attachment is connected to the working machine. This can be used both during operation (e.g. by using the auxiliary battery for fully or partially powering propulsion of the vehicle) and during charging (e.g. by distributing the charging current between the two batteries in response to individual and possibly deviating battery conditions, such as charging state, capacity, desired charging current, etc.).

The control unit is preferably configured to control each of the first and second bidirectional DC/DC converters and thus to control the flow of electric current between each battery and the electric power circuit. The control unit may be set to follow certain predetermined control rules that may differ depending on the type of work attachment/work tool that is connected to the working machine (particularly the power demand of the work tool), the charging level of the batteries, the operational state of the vehicle (operation or charging), the distance from a charging unit, etc. The control unit may in turn be manually controllable by a driver of the working machine. The control unit is preferably also configured to control the operation of all motors and other controllable components of the working machine and the work attachment.

The second bidirectional DC/DC converter may be arranged on the work attachment instead of on the working machine.

According to a further embodiment, the working machine further comprises a charging connection component connected to the first rechargeable battery, wherein the charging connection component is configured to be connected to an external battery charging unit. In principal the charging connection component may be connected to some point of the electric power circuit and thus be connected to the first battery via the electric power circuit. However, the charging connection component is preferably connected more or less directly to the first battery with the first DC/DC converter arranged between the charging connection component and the rest of the electric power circuit so that the first DC/DC converter can regulate the magnitude of the charging current that should be allowed to pass to the rest of the electric power circuit. In addition, connecting the first DC/DC converter directly to the first battery allows charging of the first battery even if the control unit and/or the first DC/DC converter are shut down/turned off.

According to a further embodiment, the first electric motor is configured for propulsion of the working machine. This could be one central electric motor, or the first electric motor could be one out of several (typically four) electric hub motors arranged at each wheel of the vehicle. The first electric motor may be configured for propulsion of the vehicle in an indirect way by working as an electric power source for hydraulic propulsion of the vehicle. In principle, it is not necessary that propulsion of the vehicle is based on electric power (i.e. batteries+electric motor) or that the first electric motor is configured for propulsion of the working machine (it could be configured for other operational tasks, such as powering of hydraulic pumps for hydraulic steering of the vehicle). However, electrically-propelled working machines have a relatively high electric power output requirement and the idea of using an auxiliary battery arranged on the work attachment is of importance mainly for such vehicles.

The working machine may comprise at least one additional electric motor arranged to drive at least one hydraulic pump for powering hydraulic systems. Such hydraulic systems may be used for steering of the vehicle, moving lift arms, driving the work tool, etc.

According to a further embodiment, the work attachment connection arrangement is configured to connect the work attachment to the vehicle both mechanically and electrically. In cases where the work attachment does not contain any battery or other electronic equipment it may be sufficient that the work attachment is connected only mechanically. In an example the working machine may be used together with a work attachment provided with an auxiliary battery and an electrically driven work tool in line with what is described above. By using only the auxiliary battery and let the first battery stay fully charged, the work attachment may be disconnected when the charging level of the auxiliary battery has become low. While charging the auxiliary battery the working machine may be used together with another work attachment that does not require any electric energy or connection (or together with another work attachment with a charged auxiliary battery). In any case, the work attachment connection arrangement may also be provided with a hydraulic connector for connection to any hydraulically driven component on the work attachment.

According to a further embodiment, the working machine is provided with at least one lift arm adapted to be attached and detached from different work attachments. Thus, the work attachment connection arrangement is arranged in association with the lift arm. Typically, the working machine is provided with two parallel spaced-apart lift arms.

According to a further embodiment, the working machine is a loader vehicle. The working machine may be an articulated vehicle comprising a pivot joint in its construction.

The invention also concerns a work attachment for a working machine, wherein the work attachment comprises a work tool, such as a sweeper/rotary broom, a snow blower or a bucket. The inventive work attachment is characterized in that it further comprises an auxiliary rechargeable battery and an electrical connector connected to the auxiliary rechargeable battery, wherein the electrical connector is configured to be connected to an electric power circuit arranged on the working machine so as to allow electric connection of the auxiliary rechargeable battery to the electric power circuit of the working machine when the work attachment is connected to the working machine.

According to an embodiment, the work attachment further comprises an electric work tool motor configured to directly or indirectly drive the work tool.

According to a further embodiment, the work attachment further comprises a second electrical connector connected to the electric work tool motor, wherein the second electrical connector is configured to be connected to the electric power circuit arranged on the working machine so as to allow electric connection of the electric work tool motor to the electric power circuit of the working machine when the work attachment is connected to the working machine.

According to a further embodiment, an electrical connection is arranged between the auxiliary rechargeable battery and the electric work tool motor so that the auxiliary rechargeable battery can work as a power source for the electric work tool motor. That is, the connection between the auxiliary battery and the work tool motor does not have to go via the working machine as described above.

According to a further embodiment, the work attachment further comprises an auxiliary charging connection component connected to the auxiliary rechargeable battery, wherein the auxiliary charging connection component is configured to be connected to an external battery charging unit. The auxiliary charging connection component can be used to charge also the first battery when the work attachment is connected to the working machine.

According to a further embodiment, the work attachment further comprises an auxiliary bidirectional DC/DC converter connected to the auxiliary rechargeable battery and to the electrical connector, wherein the auxiliary bidirectional DC/DC converter is configured to control a direction and an intensity/magnitude of an electric current that flows between the auxiliary rechargeable battery and the electrical connector and thereby to control a direction and an intensity/magnitude of an electric current that flows between the electric power circuit and the auxiliary rechargeable battery when the work attachment is connected to the working machine. As mentioned above, the auxiliary bidirectional DC/DC converter may alternatively be arranged on the working machine.

The invention also concerns a combination of a working machine of the above type and a work attachment of the above type, wherein the work attachment is connected to the working machine via the work attachment connection arrangement.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Figure 1:
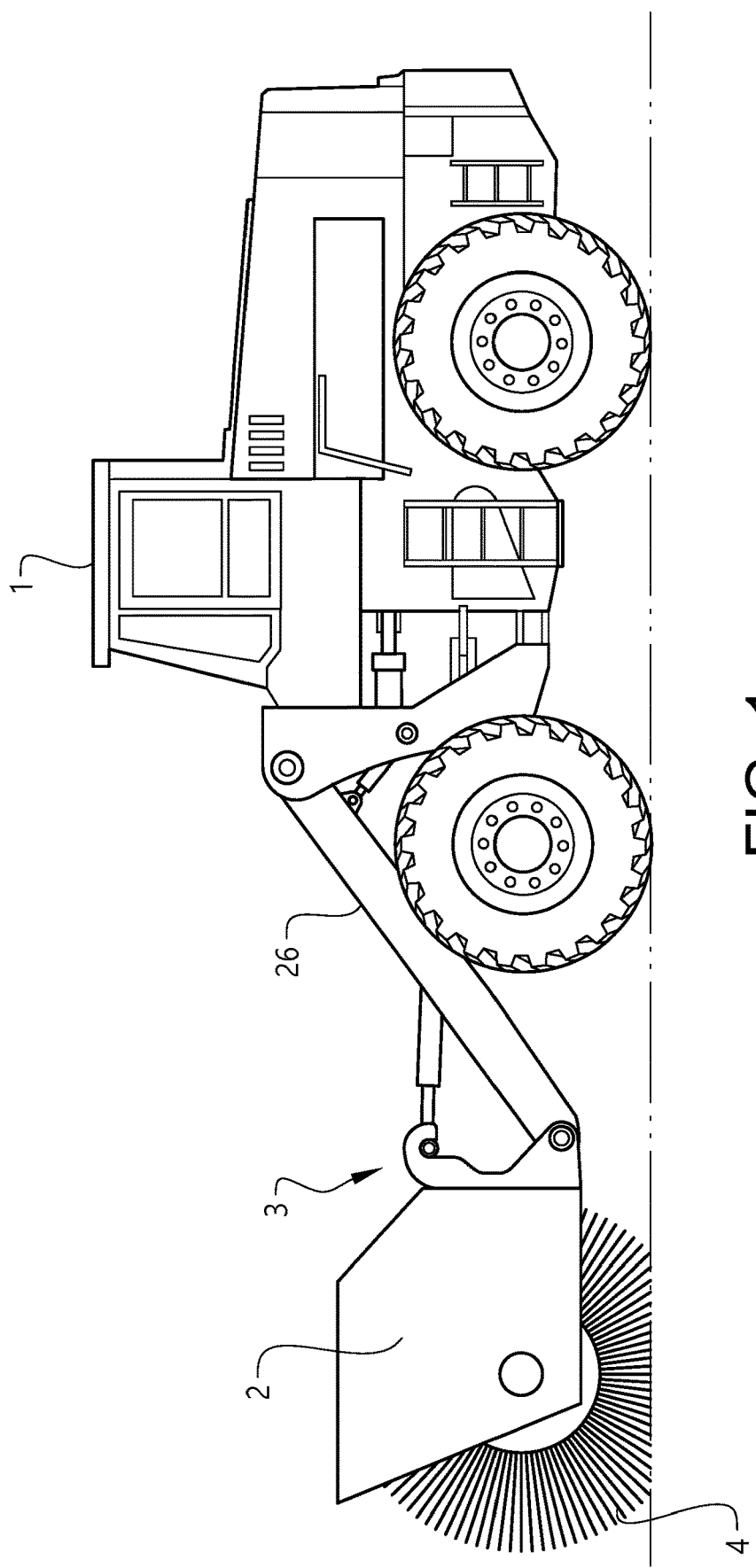
FIG. 1 shows an embodiment of a combination of a working machine and a work attachment.

FIG. 1 shows a working machine in the form of a loader vehicle 1, in particular an articulated wheel loader, operationally connected to a work attachment 2 via a work attachment connection arrangement 3 arranged on a pair of lift arms 26 on the loader vehicle 1. The work attachment connection arrangement 3 comprises electrical and mechanical connections. The work attachment 2 is provided with an electrically driven work tool in the form of a sweeper/rotary broom 4. The loader vehicle 1 is fully electrically operated and propelled.

Figure 2:
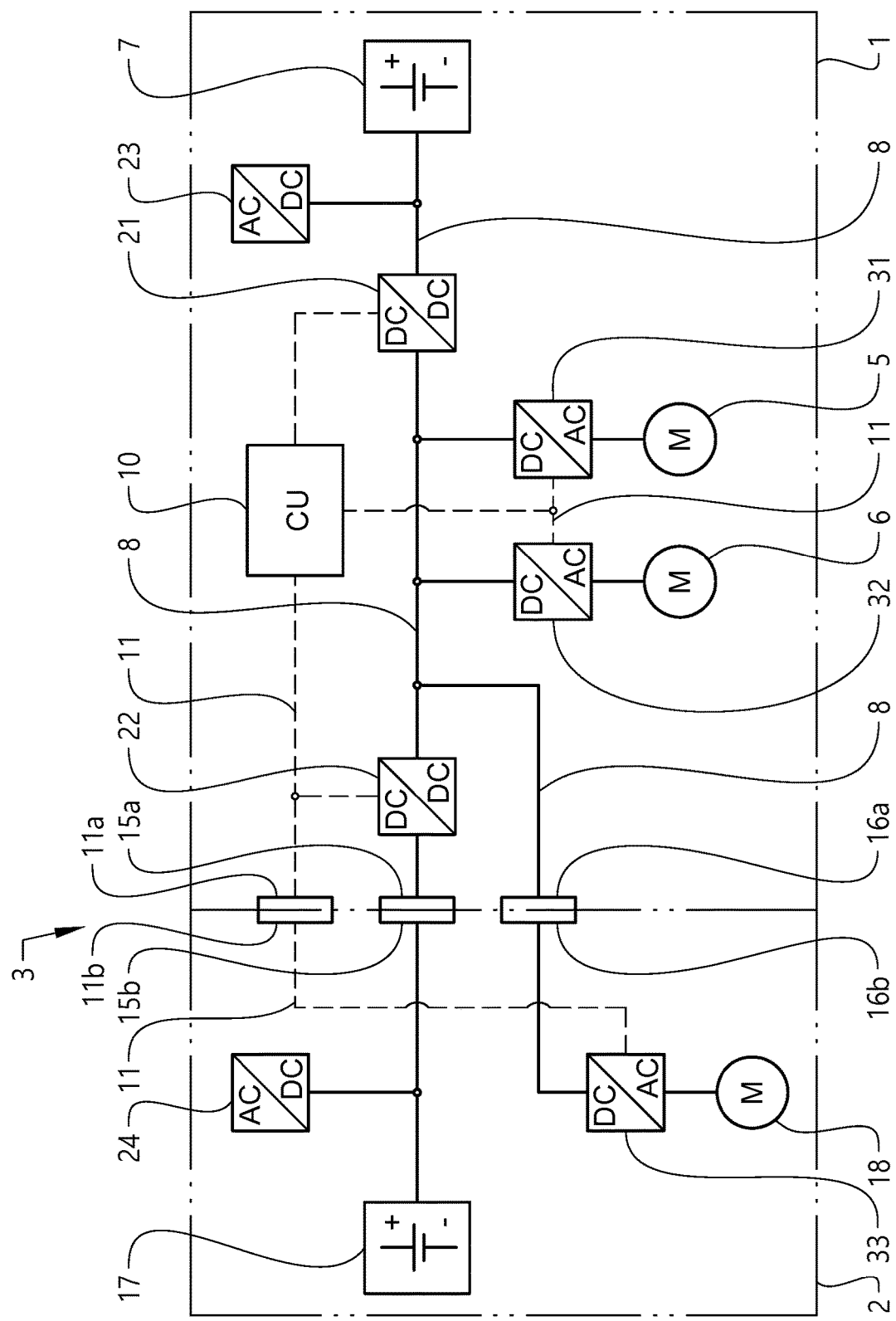
FIG. 2 shows a schematic view of the electrical connections and components of the embodiment according to FIG. 1.

FIG. 2 shows a schematic view of the electrical connections and components of the work attachment 2 and the loader vehicle 1 according to FIG. 1. As indicated in FIG. 2, the loader vehicle 1 is provided with a first electric motor 5 arranged for propulsion of the loader vehicle 1 and an additional electric motor 6 arranged to drive a hydraulic pump (not shown) for powering hydraulic systems (not shown), such as steering of the loader vehicle 1 and movement of the lift arms 26.

A first rechargeable battery 7 is configured to supply the electric motors 5, 6 with electric power via an electric power circuit 8 connecting the electric motors 5, 6 and the first rechargeable battery 7. The motors 5, 6 are connected to the electric power circuit 8 via DC/AC converters 31, 32. All electric motors in this example run on AC current/voltage.

The work attachment connection arrangement 3 comprises, besides a mechanical connection for connecting the work attachment 2 mechanically to the loader vehicle 1, a first electrical connector 15a connected to the electric power circuit 8 of the loader vehicle 1. The first electric connector 15a is connected to a corresponding electrical connector 15b arranged on the work attachment 2, wherein the corresponding electrical connector 15b is connected to an auxiliary rechargeable battery 17 arranged on the work attachment 2. Electric connection of the auxiliary rechargeable battery 17 to the electric power circuit 8 of the loader vehicle 1 is thus established when the work attachment 2 is connected to the loader vehicle 1 via the work attachment connection arrangement 3.

The work attachment connection arrangement 3 further comprises a second electrical connector 16a connected to the electric power circuit 8 of the loader vehicle 1. The second electrical connector 16a is connected to a corresponding electrical connector 16b arranged on the work attachment 2 and connected to an electric work tool motor 18 via a further DC/AC converter 33. The electric work tool motor 18 is arranged on the work attachment 2 and configured to drive the sweeper/rotary broom 4. Electric connection of the electric work tool motor 18 to the electric power circuit 8 of the loader vehicle 1 is thus established when the work attachment 2 is connected to the loader vehicle 1 via the work attachment connection arrangement 3.

A charging connection component 23, configured to be connected to an external battery charging unit, is arranged on the loader vehicle 1 and connected to the first rechargeable battery 7. An auxiliary charging connection component 24, configured to be connected to an external battery charging unit, is arranged on the work attachment 2 and connected to the auxiliary rechargeable battery 17.

The loader vehicle 1 further comprises a first bidirectional DC/DC converter 21 connected to the electric power circuit 8 and to the first rechargeable battery 7; the electric power circuit 8 and the first rechargeable battery 7 are connected via said first bidirectional DC/DC converter 21. The first bidirectional DC/DC converter 21 is configured to control a direction and an intensity/magnitude of an electric current that flows between the electric power circuit 8 and the first rechargeable battery 7.

The loader vehicle 1 further comprises a second bidirectional DC/DC converter 22 connected to the electric power circuit 8 and to the first electric connector 15a; the electric power circuit 8 and the first electric connector 15a are connected via said second bidirectional DC/DC converter 22. The second bidirectional DC/DC converter 22 is configured to control a direction and an intensity/magnitude of an electric current that flows between the electric power circuit 8 and the first electric connector 15a and thereby to control a direction and an intensity/magnitude of an electric current that flows between the electric power circuit 8 and the auxiliary rechargeable battery 17 when the work attachment 2 is connected to the loader vehicle 1 via the work attachment connection arrangement 3.

The loader vehicle also comprises a control system configured to control the operation of the loader vehicle 1 and to, when the work attachment 2 is connected to the loader vehicle 1 via the work attachment connection arrangement 3, control the operation of the work attachment 2. The control system comprises a control unit 10 and a control connection network 11 connecting the control unit 10 with components the control unit 10 is configured to control, such as the electric motors 5, 6, 18 (via their DC/AC converters 31, 32, 33) and the first and second bidirectional DC/DC converters 21, 22. A third connector 11a arranged at the work attachment connection arrangement 3 is configured to be connected to a corresponding connector 11b arranged on the work attachment 2. This corresponding connector 11b is connected to the electric work tool motor 18, via the converter 33, so as to allow the control unit 10 to control the electric work tool motor 18 when the work attachment 2 is connected to the loader vehicle 1 via the work attachment connection arrangement 3.

The control unit 10 may be controllably connected to further components, such as the batteries 7, 17 (e.g. to the BMS of the batteries to obtain information on charging state, temperature etc.), the charging connection components 23, 24 (to get information on whether a charging unit is connected etc.), and other components not shown in FIG. 2, such as components related to the steering of the loader vehicle 1.

The loader vehicle 1 is in this case an articulated vehicle comprising a pivot joint in its construction.

In this example the nominal voltage of both the batteries 7, 17 and the electric power circuit 8 is 48 V.

Both batteries 7, 17 are connected to the electric power circuit 8 via corresponding first and second bidirectional DC/DC converters 21, 22 capable of controlling to what extent and in which direction electric current, i.e. electric energy, is to flow between each battery 7, 17 and the power circuit 8. This means that during operation of the combination of the loader vehicle 1 and the work attachment 2 it can be controlled to what extent each battery 7, 17 should contribute to the power output.

Each battery 7, 17 can be used individually to power both the loader vehicle 1 (i.e. the motors 5 and 6) and the work attachment (i.e. the work tool motor 18). Both batteries 7, 17 may be used simultaneously as power source, to the same or different extent. In many situations it is advantageous to use the auxiliary battery 17 until it reaches a certain minimum level of charge and then switch to the first battery 7. This way the loader vehicle can still be in operation after having disconnected the work attachment 2. In any case, the additional capacity of electric energy provided by the auxiliary battery 17 extends the time of operation for the combination of the vehicle 1 and the work attachment 2 compared to the case where the work attachment 2 is not provided with any auxiliary battery.

If charging the combination of the vehicle 1 and the work attachment 2 when connected to each other it is in principal possible to use any of the charging connection component 24, although it may be preferred to use the charging connection component 23 arranged on the loader vehicle 1 to primarily charge the first battery 7. The loader vehicle 1 and the work attachment 2 may be disconnected and charged separately via the corresponding charging connection component 24.

It is to be understood that the present invention is not limited to the embodiments described above and illustrated in the drawings; rather, the skilled person will recognize that many changes and modifications may be made within the scope of the appended claims.

The invention claimed is:

1. A construction vehicle comprising:
a work attachment connection arrangement configured to operationally connect to the construction vehicle a work attachment provided with a work tool; and
a control system configured to control the operation of the construction vehicle and to, when the work attachment is connected to the construction vehicle via the work attachment connection arrangement, control the operation of the work attachment,
wherein the construction vehicle further comprises:
  at least a first electric motor configured for operation of the construction vehicle, operation of the construction vehicle comprising:
    operation of the work attachment; and
    propulsion of the construction vehicle;
  a first rechargeable battery configured to supply the first electric motor with electric power; and
  an electric power circuit connecting the first electric motor and the first rechargeable battery,
wherein the work attachment connection arrangement comprises a first electrical connector and second electrical connector connected to the electric power circuit of the construction vehicle,
wherein the first electric connector is configured to be connected to a corresponding electrical connector arranged on the work attachment,
wherein the second electrical connector is configured to be connected to a corresponding electrical connector arranged on the work attachment and connected to an electric work tool motor, wherein the electric work tool motor is arranged on the work attachment and configured to directly or indirectly drive the work tool, so as to allow electric connection of the electric work tool motor to the electric power circuit of the construction vehicle when the work attachment is connected to the construction vehicle via the work attachment connection arrangement, and
wherein the corresponding electrical connector is connected to an auxiliary rechargeable battery arranged on the work attachment, so as to allow electric connection of the auxiliary rechargeable battery to the electric power circuit of the construction vehicle to power the first electric motor when the work attachment is connected to the construction vehicle via the work attachment connection arrangement.

2. The construction vehicle according to claim 1, wherein the control system comprises a control unit and a control connection network connecting the control unit with components the control unit is configured to control, wherein the control connection network comprises a third connector configured to be connected to a corresponding connector arranged on the work attachment and connected to the electric work tool motor so as to allow the control unit to control the electric work tool motor when the work attachment is connected to the construction vehicle via the work attachment connection arrangement.

3. The construction vehicle according to claim 1, wherein the construction vehicle further comprises a first bidirectional DC/DC converter connected to the electric power circuit and to the first rechargeable battery, wherein the first bidirectional DC/DC converter is configured to control a direction and an intensity/magnitude of an electric current that flows between the electric power circuit and the first rechargeable battery.

4. The construction vehicle according to claim 1, wherein the construction vehicle further comprises a second bidirectional DC/DC converter connected to the electric power circuit and to the first electric connector, wherein the second bidirectional DC/DC converter is configured to control a direction and an intensity/magnitude of an electric current that flows between the electric power circuit and the first electric connector and thereby to control a direction and an intensity/magnitude of an electric current that flows between the electric power circuit and the auxiliary rechargeable battery when the work attachment is connected to the construction vehicle via the work attachment connection arrangement.

5. The construction vehicle according to claim 1, wherein the construction vehicle further comprises a charging connection component connected to the first rechargeable battery, wherein the charging connection component is configured to be connected to an external battery charging unit.

6. The construction vehicle according to claim 1, wherein the first electric motor is configured for propulsion of the construction vehicle.

7. The construction vehicle according to claim 1, wherein the construction vehicle comprises an additional electric motor arranged to drive a hydraulic pump for powering hydraulic systems.

8. The construction vehicle according to claim 1, wherein the work attachment connection arrangement is configured to connect the work attachment to the vehicle both mechanically and electrically.

9. The construction vehicle according to claim 1, wherein the construction vehicle is provided with at least one lift arm adapted to be attached and detached from different work attachments.

10. The construction vehicle according to claim 1, wherein the construction vehicle is a loader vehicle.

11. The construction vehicle of claim 1, further comprising:
- a work attachment comprising:
  - a work tool;
  - an auxiliary rechargeable battery; and
  - an electrical connector connected to the auxiliary rechargeable battery,
  - wherein the electrical connector is configured to be connected to an electric power circuit arranged on the construction vehicle so as to allow electric connection of the auxiliary rechargeable battery to the electric power circuit of the construction vehicle to operate a propulsion system of the construction vehicle when the work attachment is connected to the construction vehicle, and
  - wherein the work attachment is connected to the construction vehicle via the work attachment connection arrangement.

12. The construction vehicle according to claim 1, wherein the construction vehicle is a loader vehicle, and
  wherein the work tool is at least one of a sweeper/rotary broom, a snow blower, and a bucket.

\* \* \* \* \*